May 31, 1932.  J. L. ANDERSON  1,860,521
PIPE JOINT AND METHOD OF MAKING IT
Filed Jan. 14, 1931
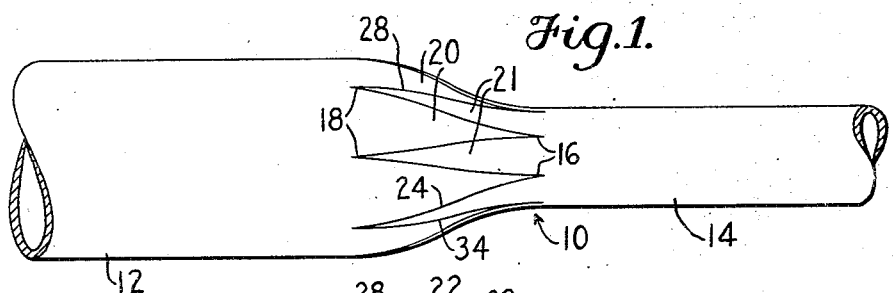
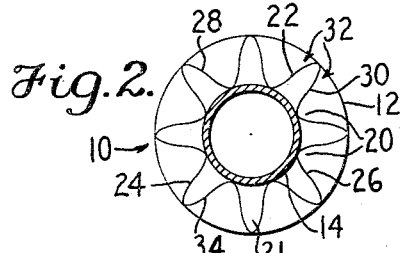
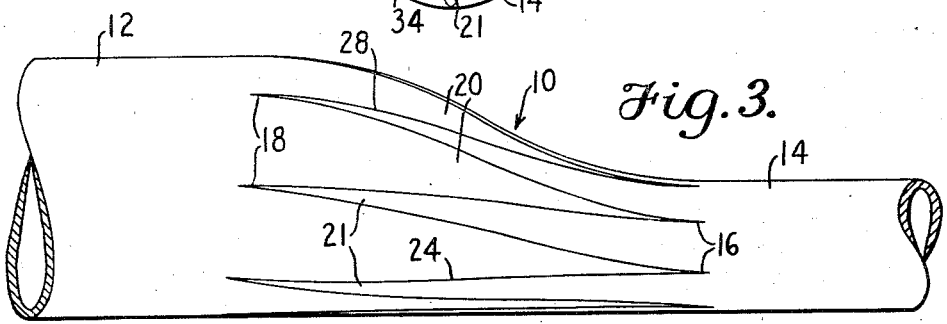
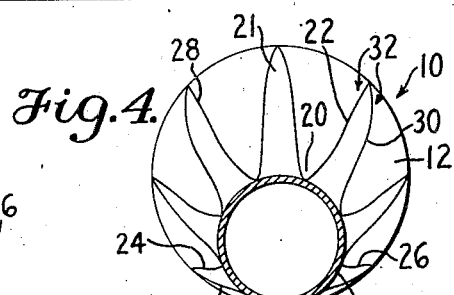
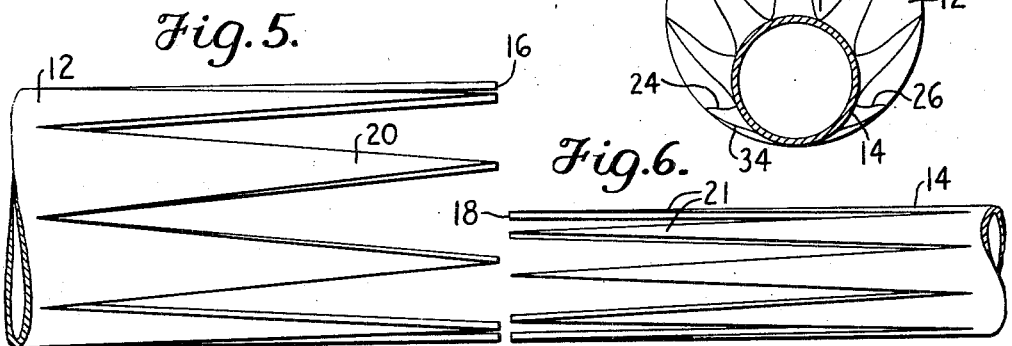
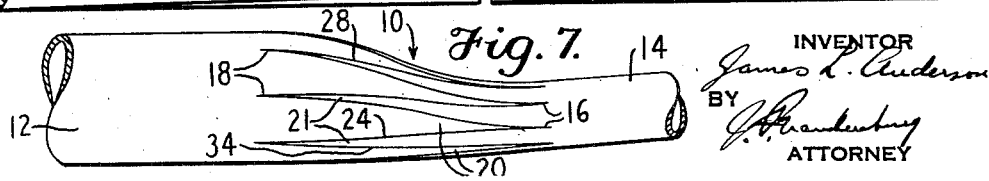
INVENTOR
James L. Anderson
BY
ATTORNEY Patented May 31, 1932

1,860,521

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

PIPE JOINT AND METHOD OF MAKING IT

Application filed January 14, 1931. Serial No. 508,658.

This invention relates to fusion welded connections for pipe or tube and their method of construction.

Particularly, the invention has reference to the union of pipe or tube sections of unequal diameters and positioned in general alinement, so that upon movement along their axes one would telescope within the other, the union of such sections forming a single, continuous member, the cross-sections of which at the junction changes gradually from that of one section to that of the other without the creation of sharp corners or the like. While the word "diameter" has been used, it is to be understood, however, that the invention may be applied to pipe or tube of shapes other than circular, the specific operations hereinafter set forth being performed in substantially the same manner and substantially similar products resulting.

As is well known, in order to connect two or more pipe sections which are not of the same diameters and which are positioned in the manner set forth, it is usually necessary to connect a member, distinct from either of the sections, and commonly known as a reducer, between the sections, either by welding the ends of the pipe sections to the reducer or in any other suitable manner assembling these parts. In any such case an individual member, and in most cases a conical frustrum, the bases of which are of substantially the same areas and extents as the end planes of the pipe sections, is used. Two distinct seams or connections must be made, that is, at each connection of a pipe section to the reducer.

The reducer must be formed as a special unit so that each end will have exactly the same dimensions as the ends of the pipe sections with which it is to be assembled. Comparatively sharp angles of change of wall direction between the two sections result. Likewise, each of the two seams is positioned circumferentially of the pipe and substantially in a single plane. In any construction of this character, the stress applied to the pipe section as fluids are forced through it and react against the changing cross-section at the reducer, and like factors, places a tearing strain upon the metal of the seam, the effect of which is directed substantially all in the same direction and is applied against the metal of the weld, which is included substantially in a plane of stress.

Furthermore, where reducers of the type above set forth are utilized, distinctly different forms are required where the distances between the axes of the pipe sections are different. That is, if the pipe sections be arranged concentrically, or if the pipe sections be arranged so that if telescoped their circular cross-sections would be tangent at some one point, or if the pipe sections be arranged at any other position between these two extremes, a distinct reducer must be provided for each set-up.

It is an object of this invention to provide a pipe connection and a method for forming the same, in which reducers of the type hereinabove set forth are entirely eliminated, and a construction is obtained in which the sections, positioned in alinement, may be disposed in any desired relation, between a concentric or a tangent position and the union effected to form a continuous member, the internal surface of which smoothly grades from the larger to the smaller section without abrupt deviations.

It is a further object of the invention to provide a construction in which only a single seam is necessary in effecting the reduction, such seam not following any single, definite line, but consisting of a number of lines disposed both longitudinally and circumferentially of the sections. This is accomplished by forming a number of V-cuts in the ends of the pipe sections, and then bending the projections thus formed so that if the sections be positioned properly the projections will interlock and provide a portion having a gradually increasing diameter, no part thereof, however, creating a sharp deviation from the original direction of the sections. The number of V-cuts may be varied and the depth thereof arranged so that the position of the sections, relatively to each other, may vary from concentric to tangential, without affecting the efficacy of the union.

The seam produced by this arrangement is intended to consist of a jagged line, crossing and recrossing the intersection with the body of the pipe of a plane transversely perpendicular to the pipe at the seam. By this arrangement no portion of the welded seam is disposed in a single line extending only transversely of the direction in which fluids flow through the sections, and the seam is therefore not subjected to the full effects of stresses arising as pressures are built up at the reduced portion, stresses which are known to tend toward the lengthening or shortening of the pipe sections rather than merely the increasing of the diameters.

Other objects of this invention will be apparent from the following description and the drawings which form a part hereof.

The invention is not intended to be restricted to the construction and arrangement of parts herein shown and described, nor to the specific methods herein set forth, nor to the precise steps or details thereof, as the same may be modified in various particulars without departing from the spirit and scope of the invention, practical embodiments of which will be illustrated and described without attempting to show all the various forms and modifications in which the invention might be embodied.

In the accompanying drawings:

Fig. 1 is a side elevational view, and Fig. 2 is an end elevational view, of a pair of pipe sections, the axes of which are positioned in the same straight lines, and which are united in accordance with the invention;

Fig. 3 is a side elevational view, and Fig. 4 is an end elevational view, of a pair of pipe sections, the axes of which are parallel but positioned eccentrically, and which are united in accordance with the invention;

Figs. 5 and 6 constitute side elevational views of the pipe sections, illustrating the step of preparation of the ends; and Fig 7 is a side elevational view illustrating the method of uniting a pair of pipe sections in accordance with the invention when one section is somewhat deflected relatively to the other.

In the reducer 10 shown on the drawings a pipe section 12 has been united with a smaller pipe section 14 by a method hereinafter set forth. In Figs. 1 and 2 the sections are disposed with their axes in the same straight line, while in Figs. 3 and 4 the axes are eccentric. The problem to which the invention is addressed is the uniting of pipe sections of dissimilar diameters in substantially a straight line, though naturally there may be slight angular deviations or displacements of the sections in relation to each other.

In order to carry out the invention as shown in the drawings, the ends 16 and 18 of the sections 12 and 14, respectively, have been cut or otherwise formed to provide a plurality of triangular projections 20 and 21, respectively. While it is not intended to limit the invention merely to the use of triangular projections, since it is possible to use any form of projection which will result in a seam suitable for the purpose of the invention, it has been found desirable because of the greater ease of construction and for subsequent efficient assembly to use long, tapering or triangular projections. Equal numbers of projections are to be formed on each section, and they are made in such manner that, when finally assembled, they will interengage, as hereinafter set forth. The contour of the projections, their number, length, and such factors, are determined also in accordance with the thickness of the pipe, the distance between the sections and the fillet desired in the reducer portion.

After these factors have been determined, the contour of the projections may be laid out to form a template, by any suitable method of drafting. The template may then be applied to the respective sections to indicate the line of marking along which the ends should be cut. After such marking, the metal at the ends of the sections is cut away to leave the projections 20, 21 extending therefrom.

Either by using a mandrel, pre-formed to the contour desired for the pipe surface when finally united and shaped, or in any other suitable manner, the projections of the larger section are bent inwardly, and those of the smaller section outwardly, until they would form, if interlocked, a surface smoothly flowing from one section to the other, with a seam consisting of a plurality of angularly disposed lines zigzagging back and forth between the two sections. The parts of the seam thus formed will lie longitudinally rather than circumferentially of the pipe walls. They therefore trend in the same direction as, and are not subjected to the full effect of, the stresses applied to the metal of the pipe walls by the fluids passing through. The edges of the projections are preferably disposed in abutting relation, but if desired they may be formed in such manner that those of one section will overlap those in the other section and thus when properly welded result in a continuous lap-seam.

The butt-welded seam is preferably welded in accordance with the procedure disclosed in my Patent No. 1,450,935, dated April 10, 1923. However, for the purpose of this invention, it is necessary to consider that circumferential deformation of the pipe may result as well as deformation of the seam edges. For this reason the process described in my copending application Serial No. 496,585, filed November 19, 1930, is also preferably followed.

Accordingly, the sections are preferably first tacked together by fusing the metal of the abutted edges intermediately of one line 22 of the seam; immediately thereafter, or simultaneously therewith, the edges forming a line 24, diametrically opposed to line 22 and disposed in opposite angular relation to line 22, are likewise tacked. Tacking at lines 26 and 28, which are disposed substantially 90° from lines 22 and 24, is then carried out, after which tacking proceeds consecutively at diametrically opposed lines, the lines in each case being at substantially half the angle of the preceding tacked point.

After all of the edges have thus been tacked, welding of the V-shaped seam formed between lines 22 and 30 beyond the tacked points, as indicated at 32, is then effected. Thereafter, the V between lines 24 and 34 is welded. The remaining V's may then be welded in an order following substantially that set forth for the tacking operation. However, in order to reduce the possibility of distortion, the V's ending at one of the sections may all be completed before the V's ending at the other section are welded. The form of the tapering prongs provides means for taking up the tensile stresses arising as contraction sets in after welding has been completed. As additional insurance against subsequent rupture, reheating of the metal may be resorted to, after the welding operation, to reduce the tensile effects.

It will be readily perceived that slight deviations from the forms above described, so that the cross-section of one section, on projection, is not contained entirely within the cross-section of the other, or where the axes of the sections are not truly parallel or in the same straight line, offer no obstacle to the performance of the invention. Such a joint is illustrated in Fig. 6.

As many changes can be made in the construction and the process, the description and drawings are to be understood as illustrative of operative but not limiting embodiments of the invention.

I claim:

1. A connection for pipe or tube sections of unequal diameters positioned in end to end relationship and extending in substantially the same direction, which includes: a plurality of fingers extending from the end edges of said sections, the fingers of adjacent end edges being formed and bent so that they interlock and form a seam, said seam including a plurality of angularly intersecting welded lines which have direction longitudinally along and circumferentially of said sections.

2. A connection for a pair of pipe or tube sections of unequal cross-sectional dimensions, positioned in end to end relationship and extending in substantially the same direction, which includes: each of said sections having the edges of one end thereof formed with a plurality of projecting portions, the portions on the smaller section being bent outwardly and those on the larger section being bent inwardly, said portions being designed so that when bent the portions on one section interlace with the portions on the associated section to form a seam.

3. A connection for a pair of pipe or tube sections of unequal cross-sectional dimensions positioned in end to end relationship and extending in substantially the same direction, which includes: each of said sections having the edges of one end thereof formed with a plurality of projecting portions, the portions on the respective sections being bent and designed so that the portions on one section will interlace with the portions on the associated section, the edge faces of said interlaced portions being in abutting relation.

4. A connection for pipe or tube sections of unequal diameters positioned in end to end relationship and extending in substantially the same direction, which includes: a plurality of fingers extending from the end edges of said sections, the fingers of adjacent end edges being formed and bent so that they interlock and form a smoothly flowing gradient between the two sections, and the seam between the interlocking fingers being welded closed.

5. A connection for pipe or tube sections of unequal diameters, positioned in end to end relationship and extending in substantially the same direction, which includes: a plurality of fingers extending from the end edges of said sections, the fingers of adjacent end edges being formed and bent so that they interlock and form a seam, said seam including a plurality of angularly intersecting welded lines.

6. A connection for a pair of pipe or tube sections of unequal cross-sectional dimensions, positioned in end to end relationship and extending in substantially the same direction, which includes: each of said sections having the edges of one end thereof formed with a plurality of projecting portions, the portions on the respective sections being bent and designed so that the portions on one section interlace with the portions on the associated section to form a seam.

7. A connection for a pair of alined pipe or tube sections of unequal diameters, the axes of which are substantially non-intersecting and are disposed in substantially the same plane, which includes: the end edges of the sections having portions thereof shaped to form complementary interlocking portions, the seam formed by said interlocking portions lying in no single plane of stress in the walls of said sections or of said portions.

8. A method of connecting a pair of alined pipe or tube sections of unequal diameters, the axes of which are substantially non-intersecting and are disposed in substantially the same plane, which includes: forming an end edge of each section with a plurality of alternate indentations and projections, shaping the projections of each section to interlock with the indentations of the associated sections, arranging the projections in interlocking relation to form a seam consisting of diagonals crossing in alternately angularly disposed relation a plane through said sections at the interlocked projections, and consecutively tacking the sections at intermediate points of pairs of diagonals diametrically opposed and of opposite angular disposition.

9. A method of connecting a pair of alined pipe or tube sections of unequal diameters, the axes of which are substantially non-intersecting and are disposed in substantially the same plane, which includes the steps of: forming an end edge of each section with a plurality of alternate indentations and projections, shaping the projections of each section to interlock with the indentations of the associated section, arranging the projections in interlocking relation to form a seam consisting of diagonals crossing in alternately angularly disposed relation a plane through said sections at the interlocked projections, and tacking the sections together at intermediate points of a pair of diametrically opposed diagonals.

10. A method of connecting a pair of pipe or tube sections of unequal diameters positioned in end to end relationship, which includes: forming the end edges of the sections with alternate projections and recesses; bending the projections; locating the pipe sections to bring the bent projections of one section into the recesses of the associated sections; the projections and recesses being so formed and arranged and the bending thereof being effected in such manner that the projections interlock with the recesses to form a smoothly curving gradient between the sections and when so interlocked the adjacent side edges of the projection are in abutment; and welding closed the seam formed by the interlocked and abutted fingers.

11. A method of connecting a pair of pipe or tube sections of unequal diameters positioned in end to end relationship, which includes the steps of: forming the end edges of the sections with alternate projections and recesses, bending the projections and locating the pipe sections to bring the bent projections of one section into the recesses of the associated sections, the projections and recesses being so formed and arranged and the bending thereof being effected in such manner that the projections interlock with the recesses to form a smoothly curving gradient between the sections, and when interlocked the adjacent side edges of the projections are in abutment.

12. A method of connecting a pair of pipe or tube sections of unequal diameters positioned in end to end relationship, which includes: forming the end edges of the sections with alternate projections and recesses, bending the projections, locating the pipe sections to bring the bent projections of one section into the recesses of the associated sections, the projections and recesses being so formed and arranged and the bending thereof being effected in such manner that the projections will interlock with the recesses to form a smoothly curving gradient between the sections, and tacking the sections together at diametrically spaced apart points and substantially at the midpoint of lines formed by edges of the projections, the welding proceeding in such manner that stresses arising from welding consecutive lines will result in strain of the metal of the projections and of the pipe sections alternately in opposite directions.

13. A method of connecting a pair of pipe or tube sections of unequal diameters positioned in end to end relationship, which includes the steps of: forming the end edges of the sections with alternate projections and recesses, bending the projections, and locating the pipe sections to bring the bent projections of one section into the recesses of the associated sections, the projections and recesses being so formed and arranged and the bending thereof being effected in such manner that the projections interlock with the recesses to form a smoothly curving gradient between the sections.

JAMES L. ANDERSON.